US006296823B1

United States Patent
Ertl et al.

(10) Patent No.: US 6,296,823 B1
(45) Date of Patent: Oct. 2, 2001

(54) METHOD AND INSTALLATION FOR ELIMINATING GASEOUS ORGANIC SUBSTANCES IN THE AIR

(75) Inventors: Harald Ertl, Geretsried; Johann Goebel, Munich, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/254,858

(22) PCT Filed: Jul. 9, 1998

(86) PCT No.: PCT/DE98/01920

§ 371 Date: Aug. 19, 1999

§ 102(e) Date: Aug. 19, 1999

(87) PCT Pub. No.: WO99/03565

PCT Pub. Date: Jan. 28, 1999

(30) Foreign Application Priority Data

Jul. 15, 1997 (DE) ............................................. 197 30 292

(51) Int. Cl.[7] ................................. A61L 9/00; A61L 9/18
(52) U.S. Cl. ..................................... 423/245.1; 423/215.5; 423/245.3; 422/122; 204/157.3; 95/113; 95/143; 96/125
(58) Field of Search ........................ 422/122; 423/245.3, 423/210, 245.1, 215.5; 219/678, 679, 686; 502/56; 95/113, 143; 96/125; 204/157.3

(56) References Cited

U.S. PATENT DOCUMENTS

| 4,312,640 | * | 1/1982 | Verrando | 55/387 |
| 4,322,394 | * | 3/1982 | Mezey | 423/230 |
| 4,348,362 | * | 9/1982 | Foss | 422/171 |
| 4,421,651 | * | 12/1983 | Burkholder | 502/56 |
| 5,282,886 | * | 2/1994 | Kobayashi | 95/131 |
| 5,447,701 | * | 9/1995 | Inoue | 423/245.3 |
| 5,512,083 | * | 4/1996 | Dunne | 95/113 |
| 5,858,316 | * | 1/1999 | Berndt | 422/245.3 |

FOREIGN PATENT DOCUMENTS

| 40 03 668 A1 | 8/1990 | (DE) . |
| 43 15 578 A1 | 11/1994 | (DE) . |
| 44 17 081 A1 | 11/1995 | (DE) . |
| 195 26 628 C1 | 12/1996 | (DE) . |
| 0 454 937 A1 | 11/1991 | (EP) . |
| 0 492 169 A1 | 7/1992 | (EP) . |
| 07-227420 | * 8/1995 | (JP) . |

OTHER PUBLICATIONS

Weissenberger, A.P., et al. "Microwave Enhanced Regeneration of Absorbents", from "Microwave Processing of Materials IV", vol. 347 of Materials Research Society Symposium Proceedings, pp. 383–394, Apr. 1994.*

Database WPI, Section Ch, Week 9543, Derwent Publications,Ltd., JP 07–227420, Aug. 29, 1995.

* cited by examiner

Primary Examiner—Steven P. Griffin
Assistant Examiner—Timothy C. Vanoy
(74) Attorney, Agent, or Firm—Crowell & Moring LLP

(57) ABSTRACT

A system for cleaning the air, such as air in the interior of motor vehicles, airplanes, buildings or shelters, having organic substances such as alcohols, alkanes and aliphatic and aromatic hydrocarbons. The air cleaning system includes a cylindrical adsorber. The cylindrical adsorber has a plurality of circular segments for passing air to be cleaned and for passing desorption air through the adsorber. The adsorber contains adsorption agents, such as a hydrophobic zeolite, that can be regenerated with microwaves. The air cleaning system also includes a microwave unit disposed on adsorber and an oxidation catalyst.

20 Claims, 1 Drawing Sheet

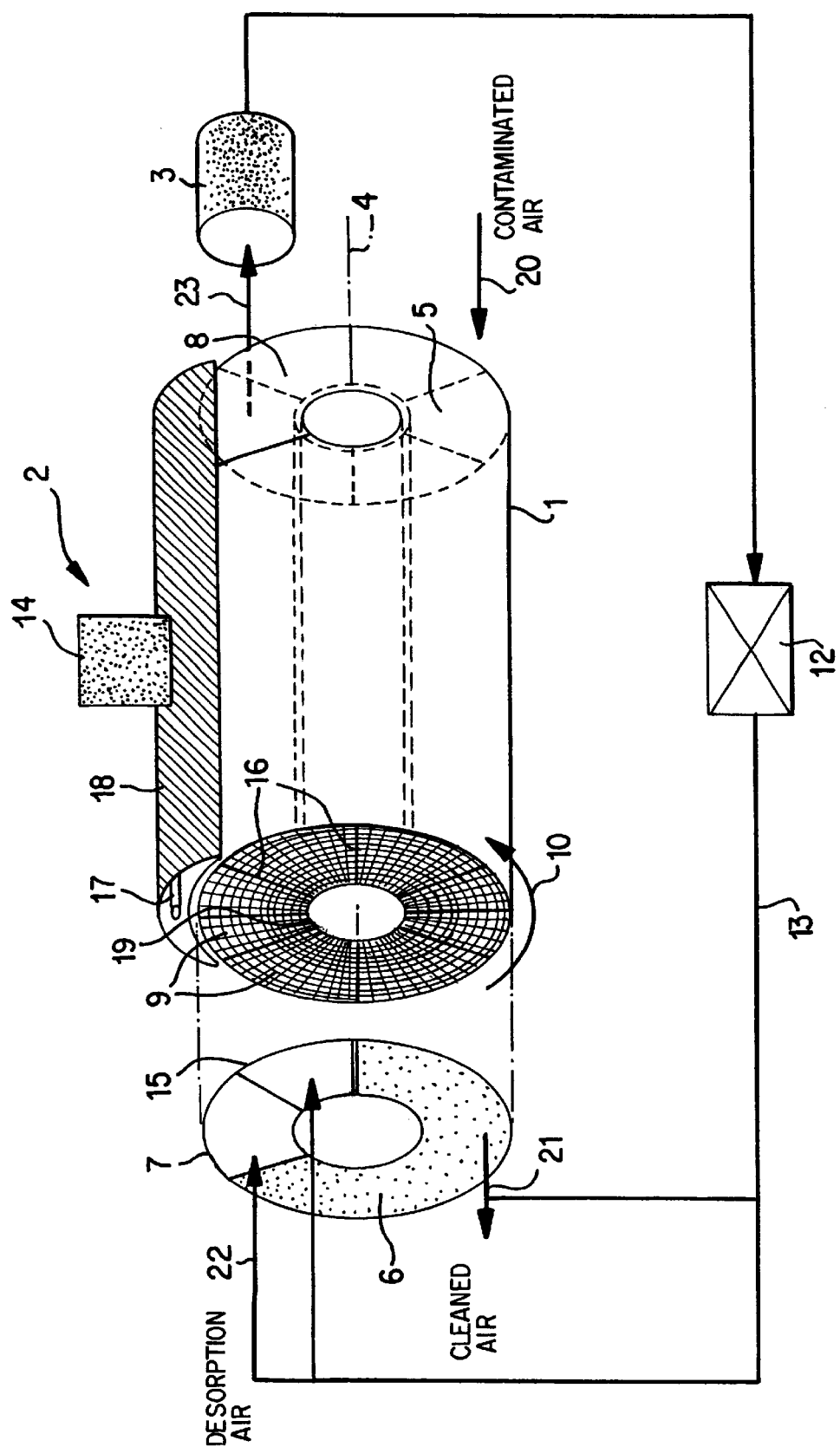

METHOD AND INSTALLATION FOR ELIMINATING GASEOUS ORGANIC SUBSTANCES IN THE AIR

BACKGROUND AND SUMMARY OF INVENTION

The invention relates to a method for the removal of gaseous organic substances from the air with an adsorbent in an adsorber, in which the adsorbent is regenerated by microwaves. It also has as an object a system for performing the process and the use of this system.

The desorption of regeneratively driven adsorption systems is customarily carried out with hot gas desorption or steam desorption technology. Since the energy input is coupled with the volume flow in this context, concentration of the desorbate is only possible to a limited extent. Particularly in hot gas desorption, the efficiency level is low since the heat capacity of air is low and heat transfer between air and the adsorbent is unfavorable. As the concentration of pollutants decreases, the energy requirement per quantity of removed pollutant increases. Thus operation of such a system in a manner that is feasible in terms of energy is only possible to a limited extent.

Due to the high dilution of the pollutants in the hot gas desorption air, disposal of the desorbent requires an additional expenditure of energy, for example by means of a burner.

Since polar molecules, in particular water, absorb microwaves, it is known to vaporize water, but also other polar organic compounds such as alcohols, that are adsorbed by an adsorbent, with a microwave generator in order to regenerate the adsorbent.

However, organic compounds that are less polar or not polar at all cannot be removed in this way. Yet the air contains a number of nonpolar or slightly polar organic pollutants that are adsorbed by the adsorbent and thus must be desorbed again during regeneration. Examples of nonpolar organic compounds in the air are alkanes or other aliphatic hydrocarbons as well as aromatic hydrocarbons such as benzene.

The object of the invention is to provide an effective, energy-efficient process for the removal of gaseous organic substances from the air.

In accordance with the invention, the adsorbed organic substances are desorbed through irradiation with microwave energy for regeneration of the adsorbent. In this process, the energy input is achieved either through direct excitation of the adsorbate (especially in the case of polar compounds, such as water, ethanol or aldehydes) and/or in that the adsorbent absorbs microwaves. In the latter case, in contrast to the desorption of polar compounds, the microwave-absorbing adsorbent is itself heated so that even nonpolar or slightly polar organic compounds are evaporated, which is to say desorbed.

Zeolites in particular have proven to be suitable as adsorbents for air cleaning, and specifically hydrophobic zeolites, which is to say zeolites with a high silicon/aluminum molar ratio. In contrast, hydrophilic zeolites with a low silicon/aluminum molar ratio preferentially adsorb water and thus have only a low adsorption capacity remaining for the organic pollutants contained in the air, hence are unsuitable for air cleaning.

The ability of a zeolitic adsorbent to be excited by microwaves is contingent upon the ion conductivity of the exchangeable cations in zeolite. The ion conductivity results from transposition of the relatively mobile cations in the zeolite lattice. Ion conductivity can be influenced by such factors as the choice of cation, the aluminum content of the lattice (modulus), the lattice type and the water content. Since the dipole character of the zeolite lattice is also dependent on the ion conductivity, the ability of a zeolitic adsorbent to be excited can be set selectively in this manner.

While the known hydrophobic zeolites are indeed suitable as adsorbents, they do not possess adequate microwave adsorption capability. As has been demonstrated, however, the microwave adsorption capacity of hydrophobic zeolites can be raised.

One possibility for doing so is to reduce the silicon/aluminum ratio of hydrophobic zeolites. For example, a commercially available hydrophobic zeolite has a silicon/aluminum ratio of approximately 100, while a commercially available hydrophilic zeolite has a silicon/aluminum ratio of approximately 1. Accordingly, the silicon/aluminum molar ratio of the zeolite should be at least 10, preferably at least 30, and less than 100, preferably no more than 90, in order to obtain zeolites that absorb microwaves on the one hand and are suitable as adsorbents on the other hand.

To set such a silicon/aluminum ratio, an ordinary commercial hydrophilic zeolite, for example, can be treated with steam or an ordinary commercial hydrophobic zeolite can be treated with silicon tetrachloride in order to dissolve out the aluminum or replace it with silicon.

If the adsorbent loaded with the pollutants has adequate microwave absorption capacity, it can then be heated in accordance with the invention directly through microwave excitation. However it is also possible in accordance with the invention to use an adsorbent that does not itself have adequate microwave absorption capacity provided that an additional solid is present in the adsorber, which itself has a high microwave adsorption capacity and thus heats the adsorbent to an adequate temperature for desorption of the organic substances. The microwave-absorbing solid can be, for example, a hydrophilic zeolite, activated charcoal, a polymer or the like.

The adsorbent can be present in a mixture with the microwave-absorbing solid. For example, the adsorber can be filled with a mixture of a (microwave-insensitive) hydrophobic zeolite and a hydrophilic zeolite as a microwave-absorbing solid. The weight ratio of the hydrophilic zeolite to the hydrophobic zeolite in such a mixture is preferably 1:10 to 1:30.

The water adsorbed from the ambient air can be excited very selectively through microwave energy. The water content of the loaded adsorber can be set through the mixture ratio of different zeolites (zeolite types, hydrophilic and hydrophobic). In this way, the energy input or the temperature level to be achieved can be set. The desorbed water displaces the nonpolar substances that cannot be excited directly by microwave energy, in a similar manner to hot steam desorption, by displacement desorption.

Through the use of microwaves, in the method in accordance with the invention the energy is quickly and very efficiently put to use for the desorption process. As a result, rapid and low-loss desorption is possible.

The frequency used for microwave desorption can be in the range from 100 MHz to 10 GHz, for example; preferably it is 2.45 GHz.

In the method in accordance with the invention, the desorption air does not represent a carrier of heat energy, for example in contrast to hot gas desorption. Therefore it can be used in relatively small quantities. Consequently, the desorbate is present in a high concentration and can therefore be fed to a catalytic oxidation process in a manner that is favorable with regard to energy.

In the method in accordance with the invention, the oxidation catalyst with which the adsorbed organic substances are oxidized can either be directly added to the adsorbent or the organic substances can be desorbed and oxidized in a catalyst that is separate from the adsorber.

The organic substances are oxidized to carbon dioxide and water by the desorption air on the oxidation catalyst. The desorption air with the oxidized organic substances is therefore preferably recirculated to the adsorber for desorption. The heat of combustion and the energy that passes from the adsorber into the desorption air by convection is thus fed back to the desorption process (heat recovery).

The oxidation catalyst can be, for example, platinum or a metal of the platinum group. For example, when oxidation of the organic substances occurs in the adsorber during regeneration of the adsorber, the zeolite or other adsorbent can contain platinum in the 0 oxidation stage (metallic clusters). Platinum or the other oxidation catalyst additionally leads to a sharp increase in the microwave absorption capacity of the adsorbent.

The method in accordance with the invention, or the system in accordance with the invention, is intended especially for cleaning of the air in spaces used by persons, especially for the cleaning of air in the interior of motor vehicles, including airplanes, and also in buildings or shelters, including for protection from contaminated outdoor air.

For preliminary cleaning of the airstream to be cleaned, a prefilter is used for particle separation. Contamination of air treatment systems with germs represents a not insignificant health hazard. At the same time, the adsorption performance is reduced by biological materials on the adsorbent. Contamination with germs is reduced efficiently through irradiation of the particle separation prefilter by microwave energy. In this context, the microwave energy for irradiating the prefilter can come from the microwave generator for irradiating the absorber, or a separate microwave generator can be employed for irradiating the prefilter.

BRIEF DESCRIPTION OF THE DRAWING

In the following, an embodiment of the system in accordance with the invention is explained in greater detail with the aid of the drawing, the single figure of which shows a schematic view of the system.

DETAILED DESCRIPTION OF THE DRAWING

The system therein consists of an adsorber 1, a microwave unit 2 mounted on the adsorber 1, and a catalytic converter 3 located separately from the adsorber 1.

The adsorber 1 is designed as a cylindrical body that has connections 5 and 8 and 6 and 7, respectively, on both sides. These connections are in the shape of segments of a circle.

The adsorber 1 consists of sectors 9, which are separated from one another through partitions 16 that extend radially. The adsorber 1 can be rotated about a cylinder axis 4 in the direction of the arrow 10. In this way, the sectors 9 are connected sequentially to the connections 5 and 6 and 7 and 8, respectively.

The opposing connections 5 and 6 are used for passage of the air to be cleaned through the adsorber 1, which is to say movement of the air to be cleaned into and out of the adsorber 1, as shown by the arrows 20 and 21. The opposing connections 7 and 8 are used for passage of the desorption air through the adsorber 1, which is to say to enter and exit the adsorber 1, as shown through the arrows 22 and 23.

The connections 5 through 8 and the adsorber 1 must be arranged so they are capable of rotation relative to one another about the cylinder axis 4. In other words, it is also possible to make the connections rotate and the adsorber 1 remain stationary, instead of rotating the adsorber 1 as shown in the drawing.

The catalyst 3 is connected by a line, which is represented by the arrow 23, to the outlet 8 for the desorption air. The organic substances oxidized to water and carbon dioxide in the catalytic converter 3 are recycled by a blower 12 through the line 13 back to the adsorber 1.

For this purpose, the recycled desorption air can be supplied to the desorption air line represented by the arrow 22, or as shown in the drawing, to an additional segment-shaped connection 15 arranged on the same side of the adsorber 1 as the connection 7 where the desorption air 22 enters. The connection 15 is located next to the connection 7, specifically ahead of the connection 7 in the rotational direction 10 of the adsorber 1. When the recycled gas is supplied in the separate connection 15, the blower 12 can be omitted.

The microwave unit 2 is designed for microwave irradiation on sectors 9 of the cylindrical adsorber 1, which joins the connections 7 and 8 for passage of the desorption air. For this purpose, the microwave unit 2 can have an antenna 17 with a reflector 18 extending externally along the adsorber 1. The microwave generator 14 is arranged on the reflector 18. An additional reflector 19 can be provided in the vicinity of the rotational axis 4 within the cylindrical adsorber 1.

The discharged volume fractions of the oxidized desorbate can be fed into the cleaned air 21.

In accordance with the drawing, the desorption air 22, 23 is carried in a countercurrent flow relative to the air to be cleaned 20, 21.

Moreover, the microwave unit 2 can be designed to rotate instead of the adsorber 1.

What is claimed is:

1. A system for cleaning the air in spaces used by persons, comprising:
   A. a cylindrical adsorber comprising:
      (1) a plurality of circular segments for passing air to be cleaned and for passing desorption air through the adsorber, wherein the plurality of circular segments are located on opposite ends of the adsorber;
      (2) an adsorption agent that can adsorb nonpolar organic substances and can be regenerated with microwaves; and
      (3) one or more sectors for receiving microwaves;
   B. a microwave unit disposed on the adsorber; and
   C. an oxidation catalyst, wherein the oxidation catalyst is separate from the adsorber.

2. A system according to claim 1, wherein the microwave unit comprises:
   an antenna extending externally along the adsorber; and
   an external reflector.

3. A system according to claim 2, further comprising an internal reflector in the vicinity of a rotational axis of the adsorber.

4. A system according to claim 1, further comprising a prefilter for particle separation, wherein the prefilter is disposed upstream of the adsorber.

5. A system according to claim 1, further comprising a line from the oxidation catalyst to the absorber for conducting oxidized organic substances to the adsorber.

6. A system according to claim 1, further comprising a microwave-absorbing solid material in the adsorber in addition to the adsorbent.

7. A system according to claim 6, wherein the microwave-absorbing solid material is a hydrophilic zeolite.

8. A system according to claim 6, wherein the adsorption agent is a hydrophobic zeolite.

9. A system according to claim 6, wherein the adsorption agent and microwave-absorbing solid material comprise a mixture of a hydrophilic zeolite and a hydrophobic zeolite.

10. A system according to claim 9, wherein a weight ratio between the hydrophilic zeolite and the hydrophobic zeolite is 1:3 to 1:10.

11. A system according to claim 1, wherein the cylindrical adsorber is rotatable.

12. A system according to claim 1, wherein at least one of the plurality of circular segments or microwave unit is rotatable around an axis of the cylindrical adsorber.

13. A method for cleaning air, comprising:
   A. passing air comprising organic substances through an adsorber system comprising (1) a cylindrical adsorber having an adsorption agent; a microwave-absorbing solid; and a plurality of circular segments for passing air to be cleaned and for passing desorption air through the adsorber, wherein the plurality of circular segments are located on opposite ends of the adsorber and are rotatable around an axis of the adsorber; and
   (2) a microwave unit disposed on the adsorber;
   B. cleaning the air by adsorbing organic substances on the adsorption agent;
   C. passing desorption air through the adsorber;
   D. regenerating the adsorption agent by subjecting at least one of the adsorption agent and the microwave-absorbing solid to microwave radiation, thereby desorbing the organic substances into the desorption air; and
   E. oxidizing the desorbed organic substances with an oxidation catalyst.

14. A method according to claim 13, further comprising recycling the desorption air containing the oxidized organic substances from the oxidation catalyst to the adsorber.

15. A method according to claim 13, further comprising recycling the desorption air containing the oxidized organic substances from the oxidation catalyst to the absorber at a connection that is rotationally upstream of a connection for the desorption air.

16. A method according to claim 13, wherein the desorption air is conducted through the adsorber counter-current to the air comprising organic substances.

17. A method according to claim 13, further comprising:
   filtering the air comprising organic substances before passing through the adsorber with a prefilter; and
   subjecting the prefilter to microwave radiation.

18. A method according to claim 13, wherein the air is from an interior of a motor vehicle, an airplane, or a building.

19. A method according to claim 13, wherein the regenerating of the adsorption agent is by subjecting the microwave-absorbing solid to microwave radiation.

20. A method according to claim 13, wherein the organic substances are less polar than water or an alcohol or are nonpolar.

* * * * *